(No Model.) 2 Sheets—Sheet 1.
A. W. JACKSON.
HOSE COUPLING.

No. 480,197. Patented Aug. 2, 1892.

WITNESSES:
J. Snowden Bell
T. J. Hogan.

INVENTOR.
Amanda W. Jackson
by George H. Christy
Att'y.

(No Model.) 2 Sheets—Sheet 2.
A. W. JACKSON.
HOSE COUPLING.

No. 480,197. Patented Aug. 2, 1892.

WITNESSES:
Snowden Bell
T. J. Hogan.

INVENTOR,
A. W. Jackson,
by George H. Christy
Att'y.

UNITED STATES PATENT OFFICE.

AMARIAH W. JACKSON, OF CHICAGO, ILLINOIS, ASSIGNOR TO THE WESTINGHOUSE AIR BRAKE COMPANY, OF PITTSBURG, PENNSYLVANIA.

HOSE-COUPLING.

SPECIFICATION forming part of Letters Patent No. 480,197, dated August 2, 1892.

Application filed December 3, 1891. Serial No. 413,909. (No model.)

*To all whom it may concern:*

Be it known that I, AMARIAH W. JACKSON, a citizen of the United States, residing at Chicago, in the county of Cook and State of Illinois, have invented or discovered a certain new and useful Improvement in Hose-Couplings, of which improvement the following is a specification.

The object of my invention is to provide a detachable coupling for pipes or hose which shall be of simple construction and in which the gaskets which form the air-tight joint between the two halves of the coupling shall be capable of being quickly and conveniently removed and replaced.

To this end my invention consists in certain improvements, hereinafter set forth, in couplings of the ordinary form, (particularly those having an opening in the back for the insertion of a compressor for holding the gasket in place,) whereby the gasket which forms the air-tight joint may be removed and replaced without breaking the joint which is formed by the screw-plug which closes the opening in the back of the shell.

Figure 1:
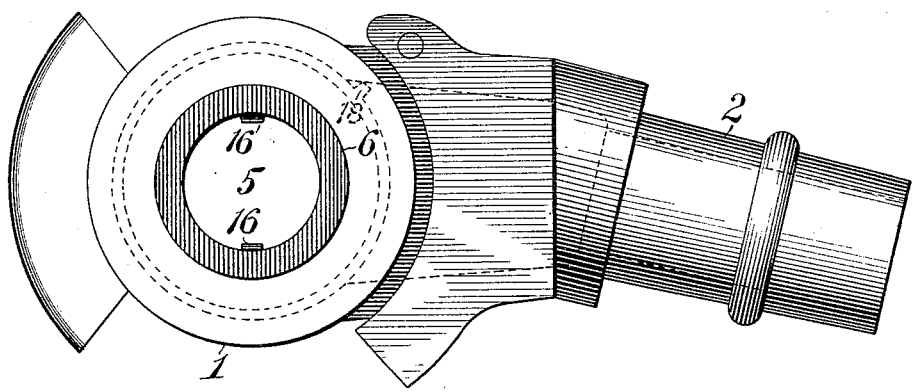
Figure 2:
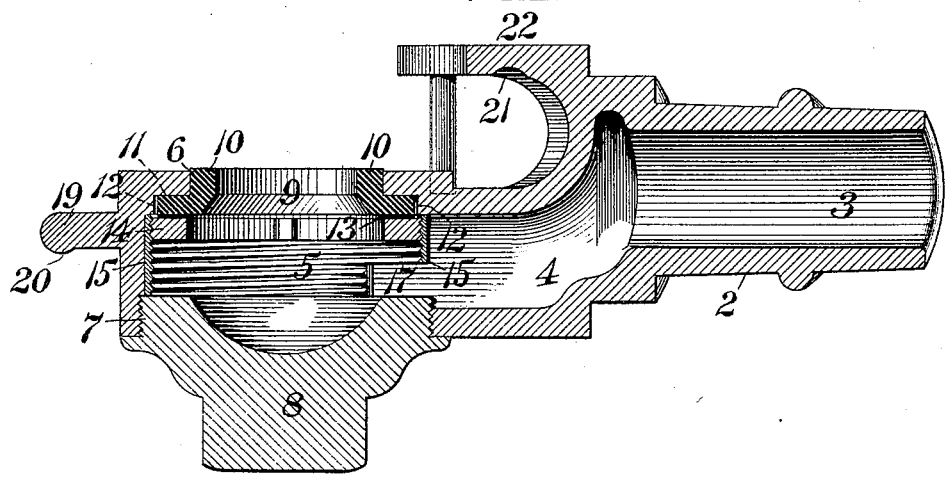
Figure 3:
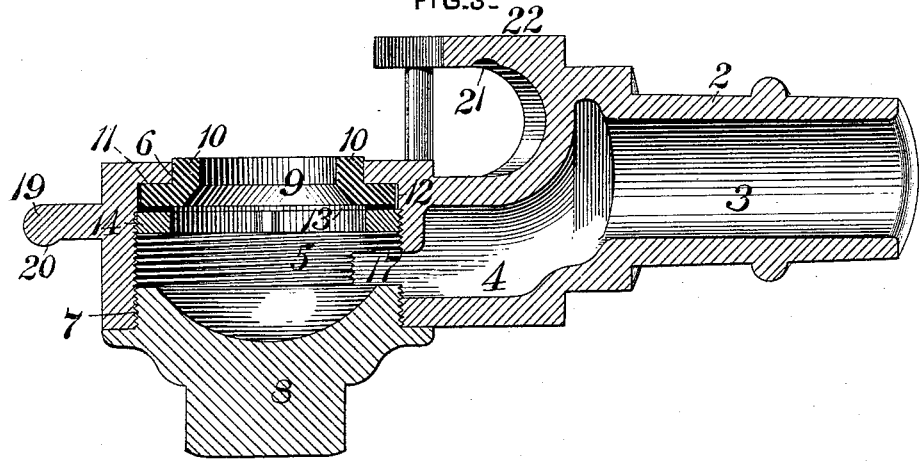
Figure 4:
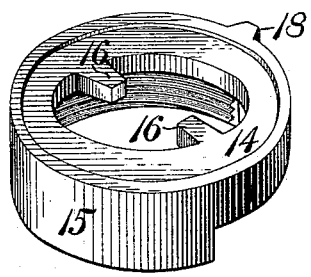
Figure 5:
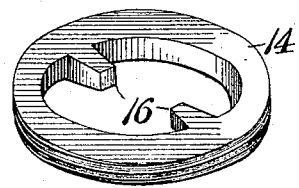
Figure 6:
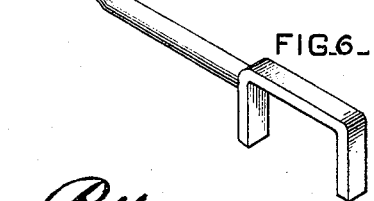

In the accompanying drawings, which illustrate my invention, Figure 1 is a side elevation of the coupling-shell; Fig. 2, a longitudinal central section of the same; Fig. 3, a longitudinal section of a modification; Fig. 4, a perspective view of the compressor-ring and the internally-screw-threaded ring in which it is fitted; Fig. 5, a perspective view of the compressor-ring detached, and Fig. 6 a similar view of a tool for turning the compressor-ring.

The coupling shown is of the ordinary Westinghouse type, such as is used on the ends of flexible hose for connecting the fluid-conveying pipes of different cars together. The complete coupling device consists of two parts, such as are shown in the drawings, which are identical in construction and which form a closed passage when properly brought together, so that the gaskets in the openings in their faces abut and make a tight joint.

The drawings illustrate a shell or half-coupling section 1, having a nozzle 2 for connection to the flexible hose, inclosing a passage 3, opening into the chamber 4, formed in the shell. The chamber 4 opens into a cylindrical chamber 5, which is concentric with the opening 6 in the face of the coupling and with the opening 7 in the back of the coupling, into which the screw-plug 8 is fitted. A gasket 9, of ordinary form, is fitted into the opening 6, with the end of its body 10 projecting from the face of the coupling and having a flange 11 fitting into the opening 12 and bearing on a shoulder formed by the wall of the coupling-face. On the inner side of the gasket and bearing against the flange 11 is a thin annular plate of metal 13, which is pressed against the gasket by the compressor 14. The compressor 14 is a ring screw-threaded on the outside, so as to fit in the screw-thread on the inside of a larger ring 15, (see Fig. 2,) which is held in place by the screw-plug 8, which closes the opening in the back of the shell.

In putting the parts together the gasket 9 is first put in place, the thin ring 13 is placed against it, and the ring 15 is placed in the cylindrical chamber 5, (the ring 15 may, however, be placed in position before any of the other parts,) and the compressor 14 is screwed into the ring 15. The plug 8 is then screwed into place, so as to hold the ring 15 in position, and then the compressor 14 is turned until it bears with sufficient force on the ring 13 to hold the gasket in place. The ring 13 presents a smooth surface to the corresponding surface of the compressor and permits the compressor to be turned without turning the gasket after the compressor has been turned into position to bring a pressure on the gasket.

Projections 16 are formed on the inside of the compressor 14, whereby it may be turned in the ring 15, so that it may be moved toward or away from the gasket 9. Any instrument that can be inserted in the opening through the gasket so as to bear on the sides of the projections 16 may be used for this purpose, or such a device as that shown in Fig. 6 may be used; or, slots may be formed in the compressor instead of the projections 16. The ring 15 has an opening 17 on one side by which the chamber 4 communicates with the chamber 5 to form a passage through the shell, and a projection 18 is formed on the ring 15 and bears against the side of the chamber 4 to prevent the ring 15 from being turned by the screw-plug 8, so that the opening 17 will always connect the chambers 4 and 5.

The coupling-shell, with the screw-plug 8 and the flange 19, having the cam-surface 20, which engages with a corresponding cam-groove 21, formed in the flange 22 of the other half-coupling shell, may be of any of the well-known forms now in use. That shown is of the form used in the Westinghouse air-brake system.

Fig. 3 shows a modification in which the screw-thread for the compressor 14 is formed on the wall of the chamber 5 instead of on a separate ring, as in Fig. 2. This screw-thread may be a continuation of the thread into which plug 8 is screwed.

In the ordinary form of coupling, in which a screw-plug is used for closing the opening in the back, the screw-plug holds the compressor in place and must be unscrewed in order to allow the gasket to be removed. This requires a great deal of force and necessitates the placing of the coupling in a vise and the employment of a wrench having a long lever to turn the screw-plug. It will be seen that this operation cannot well be performed on the road, but requires that the coupling be taken to a shop.

With my improvement the gasket may be easily and quickly removed at any time without disturbing the plug, and when a separate ring 15 is employed no change is required to be made in the present form of coupling-shell, as the counterbore or enlarged cylindrical chamber 5 already exists in this form of coupling. It will only be necessary to insert the threaded ring 15 and compressor 14 and cut off the screw-plug, so that it will bear against the ring 15 when screwed into position.

When it is necessary to remove the gasket, the compressor is turned and moves in the threaded ring 15 away from the gasket, thus relieving the gasket of pressure and permitting its removal through the opening 6. Another gasket may then be inserted in its place and the compressor turned so as to screw it back to its former position to clamp the gasket in place.

I claim as my invention and desire to secure by Letters Patent—

1. In a detachable hose-coupling, the combination, with a coupling-shell having a chamber formed therein and an opening in the face of the coupling of smaller diameter than the chamber, of a gasket fitting in the opening and a compressor-ring having a peripheral screw-thread engaging a screw-thread in the chamber and adjustable independently of the screw-plug in the back of the coupling, substantially as set forth.

2. In a detachable hose-coupling, the combination, with a coupling-shell having a chamber formed therein and an opening in the face of the coupling of smaller diameter than the chamber, of a gasket fitting in the opening and provided with a flange bearing against the wall of the shell and a compressor-ring located entirely within the chamber inside of the flange and disconnected from the closing parts of the back of the coupling and having a peripheral screw-thread engaging a screw-thread in the chamber, whereby the compressor-ring may be moved outwardly to clamp the flange of the gasket, substantially as set forth.

3. In a detachable hose-coupling, the combination of a coupling-shell having a chamber formed therein, a removable threaded ring located in the chamber, a compressor having a peripheral screw-thread engaging the thread on the ring, and a gasket fitting in an opening in the face of the coupling and held in place by the compressor, substantially as set forth.

4. In a detachable hose-coupling, the combination of a coupling-shell having a chamber therein and an opening in the face of the coupling of smaller diameter than the chamber, a ring fitting in the chamber and screw-threaded on its inner side, and a compressor having a peripheral screw-thread adapted to engage the thread on the ring, whereby the compressor may be moved back and forth, so as to clamp or release a gasket in the opening in the face of the coupling, substantially as set forth.

5. In a detachable hose-coupling, the combination of a coupling-shell having a chamber therein and an opening in the face of the coupling of smaller diameter than the chamber, a screw-threaded ring in the chamber, a screw-threaded compressor fitted in the ring, and a screw-plug fitting in an opening in the back of the shell for the insertion of the ring and compressor, substantially as set forth.

6. In a detachable hose-coupling, the combination of a coupling-shell having a chamber therein and an opening in the face of the coupling, a cylindrical gasket fitting in the opening and provided with a flange on its inner end, a ring bearing on the flange, and a compressor adjustable through the opening in the face of the coupling independently of the back parts of the coupling and adapted to clamp the ring against the flange on the gasket, the compressor being provided with a peripheral screw-thread engaging a screw-thread in the chamber, substantially as set forth.

In testimony whereof I have hereunto set my hand.

AMARIAH W. JACKSON.

Witnesses:
O. W. BOND,
F. W. ROBINSON.